United States Patent
Hillard et al.

(10) Patent No.: US 11,467,288 B2
(45) Date of Patent: Oct. 11, 2022

(54) LIDAR SYSTEM AND METHOD OF OPERATION

(71) Applicant: Red Leader Technologies, Inc., Palo Alto, CA (US)

(72) Inventors: Jacob Hillard, Palo Alto, CA (US); John Dean, Palo Alto, CA (US); Jhoneldrick Millares, Palo Alto, CA (US); Rebecca Wong, Palo Alto, CA (US); Logan Herrera, Palo Alto, CA (US)

(73) Assignee: Red Leader Technologies, Inc., Palo Alto, CA (US)

( * ) Notice: Subject to any disclaimer, the term of this patent is extended or adjusted under 35 U.S.C. 154(b) by 508 days.

(21) Appl. No.: 16/663,142

(22) Filed: Oct. 24, 2019

(65) Prior Publication Data
US 2020/0132847 A1 Apr. 30, 2020

Related U.S. Application Data

(60) Provisional application No. 62/749,795, filed on Oct. 24, 2018, provisional application No. 62/750,058, filed on Oct. 24, 2018.

(51) Int. Cl.
*G01S 17/89* (2020.01)
*G01S 7/48* (2006.01)
(Continued)

(52) U.S. Cl.
CPC ............ *G01S 17/89* (2013.01); *G01S 7/4804* (2013.01); *G01S 7/4815* (2013.01); *G01S 7/4816* (2013.01); *G01S 7/4817* (2013.01); *G01S 7/4865* (2013.01); *G01S 7/4911* (2013.01); *G01S 7/4914* (2013.01); *G01S 17/26* (2020.01)

(58) Field of Classification Search
CPC ........ G01S 17/88; G01S 17/89; G01S 17/931; G01S 7/4865; G01S 17/26; G01S 7/4804; G01S 7/4815; G01S 7/4816; G01S 7/4817; G01S 7/4911; G01S 7/4914
See application file for complete search history.

(56) References Cited

U.S. PATENT DOCUMENTS

| 5,532,697 A | 7/1996 | Hidaka et al. |
| 6,031,601 A | 2/2000 | McCusker et al. |

(Continued)

FOREIGN PATENT DOCUMENTS

| CN | 103616696 A | 3/2014 |
| DE | 102012112985B3 | 12/2013 |

(Continued)

OTHER PUBLICATIONS

International Search Report and Written Opinion for PCT Application No. PCT/US2019/57954 dated Jan. 17, 2020.
(Continued)

*Primary Examiner* — Peter M Bythrow
(74) *Attorney, Agent, or Firm* — Jeffrey Schox; Samuel Rosenthal (57) ABSTRACT

A LIDAR system, preferably including one or more: optical emitters, optical detectors, beam directors, and/or processing modules. A method of LIDAR system operation, preferably including: determining a signal, outputting the signal, receiving a return signal, and/or analyzing the return signal.

18 Claims, 8 Drawing Sheets

(51) Int. Cl.
  *G01S 7/481* (2006.01)
  *G01S 7/4865* (2020.01)
  *G01S 17/26* (2020.01)
  *G01S 7/4911* (2020.01)
  *G01S 7/4914* (2020.01)

(56) References Cited

U.S. PATENT DOCUMENTS

| | | | |
|---|---|---|---|
| 7,532,311 B2 | 5/2009 | Henderson et al. | |
| 7,642,963 B2 | 1/2010 | Apostolos et al. | |
| 8,072,582 B2 | 12/2011 | Meneely | |
| 8,605,261 B2 | 12/2013 | Rindle | |
| 9,097,646 B1 | 8/2015 | Campbell et al. | |
| 9,684,076 B1 | 6/2017 | Feldkhun | |
| 9,759,810 B1 * | 9/2017 | Sankar | G01S 17/58 |
| 10,267,898 B2 | 4/2019 | Campbell et al. | |
| 10,488,492 B2 * | 11/2019 | Hamel | G01S 7/487 |
| 10,527,727 B2 * | 1/2020 | Bondy | G01S 17/89 |
| 10,591,604 B2 | 3/2020 | Xu | |
| 10,845,470 B2 * | 11/2020 | Verghese | G01S 17/931 |
| 10,928,485 B1 * | 2/2021 | Karadeniz | G01S 7/4813 |
| 10,969,475 B2 * | 4/2021 | Li | G01S 7/484 |
| 11,054,508 B2 * | 7/2021 | Li | G01S 7/484 |
| 11,204,420 B2 * | 12/2021 | Kubota | G01S 7/4865 |
| 2006/0227317 A1 | 10/2006 | Henderson et al. | |
| 2009/0195454 A1 | 8/2009 | Apostolos et al. | |
| 2010/0045965 A1 * | 2/2010 | Meneely | G01S 17/10 356/5.01 |
| 2011/0255070 A1 | 10/2011 | Phillips et al. | |
| 2012/0281200 A1 * | 11/2012 | Rindle | G01S 17/18 356/5.03 |
| 2013/0258312 A1 * | 10/2013 | Lewis | G01S 7/4865 356/4.01 |
| 2016/0154104 A1 * | 6/2016 | Schumann | G01S 15/52 367/91 |
| 2016/0259038 A1 * | 9/2016 | Retterath | G01S 7/4802 |
| 2016/0266246 A1 * | 9/2016 | Hjelmstad | G01S 15/86 |
| 2016/0327637 A1 | 11/2016 | Gazit et al. | |
| 2017/0307726 A1 * | 10/2017 | Mazzaro | G01S 13/32 |
| 2018/0188368 A1 * | 7/2018 | Zuffada | G01S 7/4863 |
| 2018/0224535 A1 * | 8/2018 | Sankar | G01S 13/584 |
| 2018/0259645 A1 * | 9/2018 | Shu | G01S 17/42 |
| 2018/0267169 A1 * | 9/2018 | Xu | G01S 17/894 |
| 2018/0275249 A1 * | 9/2018 | Campbell | G01S 17/89 |
| 2018/0275252 A1 | 9/2018 | Fried et al. | |
| 2018/0292534 A1 * | 10/2018 | Field | G01S 17/10 |
| 2018/0299554 A1 * | 10/2018 | Van Dyck | G01S 17/894 |
| 2018/0373260 A1 * | 12/2018 | Lipson | G05D 1/0223 |
| 2019/0011541 A1 | 1/2019 | O'Keeffe | |
| 2019/0056497 A1 * | 2/2019 | Pacala | G01S 7/4865 |
| 2019/0086531 A1 * | 3/2019 | Rick | G01S 13/34 |
| 2019/0120939 A1 | 4/2019 | O'Keeffe | |
| 2019/0179018 A1 * | 6/2019 | Gunnam | G01S 17/89 |
| 2019/0353787 A1 * | 11/2019 | Petit | G01S 7/484 |
| 2020/0132847 A1 * | 4/2020 | Hillard | G01S 7/4804 |
| 2020/0132848 A1 | 4/2020 | Hillard et al. | |
| 2021/0072381 A1 | 3/2021 | Crouch et al. | |
| 2021/0156970 A1 | 5/2021 | Baier et al. | |

FOREIGN PATENT DOCUMENTS

| | | |
|---|---|---|
| DE | 102016222138 A1 | 5/2018 |
| JP | 2018009829 A | 1/2018 |
| WO | 2010040924 A1 | 4/2010 |
| WO | 2018050906 A2 | 3/2018 |
| WO | 2020086903 A1 | 4/2020 |
| WO | 2020086906 A1 | 4/2020 |

OTHER PUBLICATIONS

Ke, Pinhui, et al., "A Generic Constructions of Z-Periodic Complementary Sequence Sets with Flexible Flock Size and Zero Correlation Zone Length", IEEE Signal Processing Letters, vol. 22, No. 9, Sep. 2015.

Liu, Zilong, et al., "Correlation and Set Size Bounds of Complementary Sequences with Low Correlation Zone", IEEE Transactions on Communications, Dec. 2011.

* cited by examiner

LIDAR SYSTEM AND METHOD OF OPERATION

CROSS-REFERENCE TO RELATED APPLICATIONS

This application claims the benefit of U.S. Provisional Application Ser. No. 62/749,795, filed on 24 Oct. 2018, and of U.S. Provisional Application Ser. No. 62/750,058, filed on 24 Oct. 2018, each of which is incorporated in its entirety by this reference.

TECHNICAL FIELD

This invention relates generally to the object detection and/or imaging field, and more specifically to a new and useful lidar system and method of operation in the object detection and/or imaging field.

BACKGROUND

Typical lidar systems and methods of use have fixed range, resolution, and/or accuracy. Further, their performance with respect to these metrics is typically significantly limited due to a need to wait for each light pulse to return before emitting the next light pulse. Thus, there is a need in the object detection field to create a new and useful lidar system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
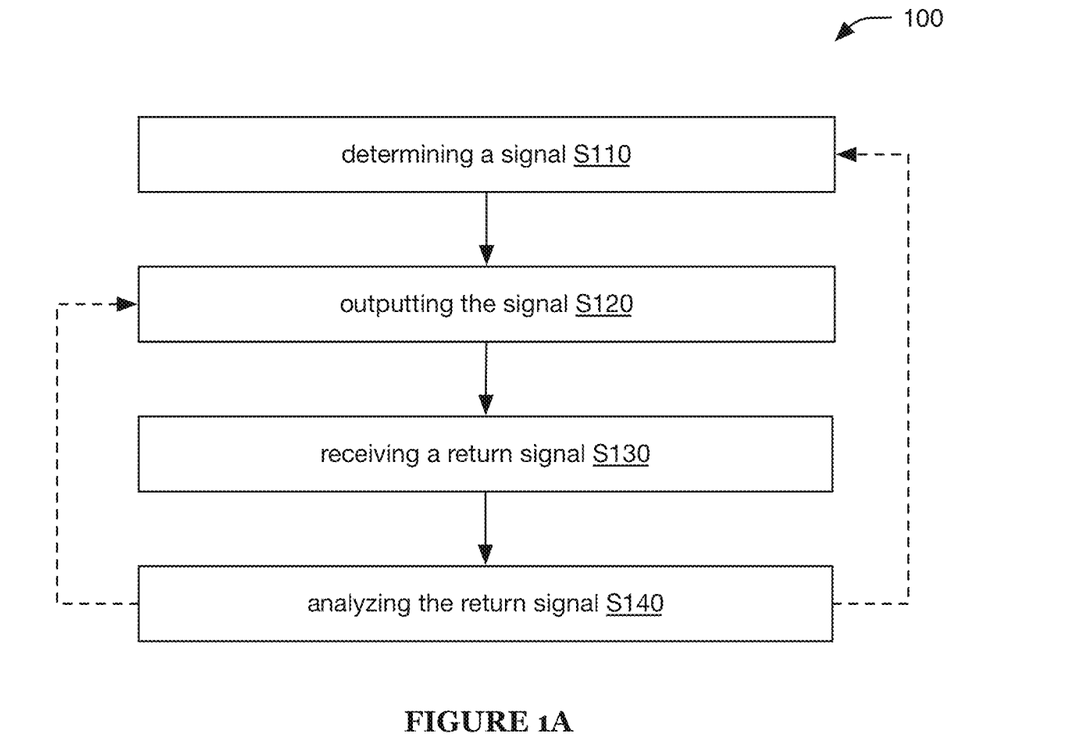
FIGS. 1A-1B are flowchart representations of an embodiment of the method and an example of the embodiment, respectively.
Figure 1B:
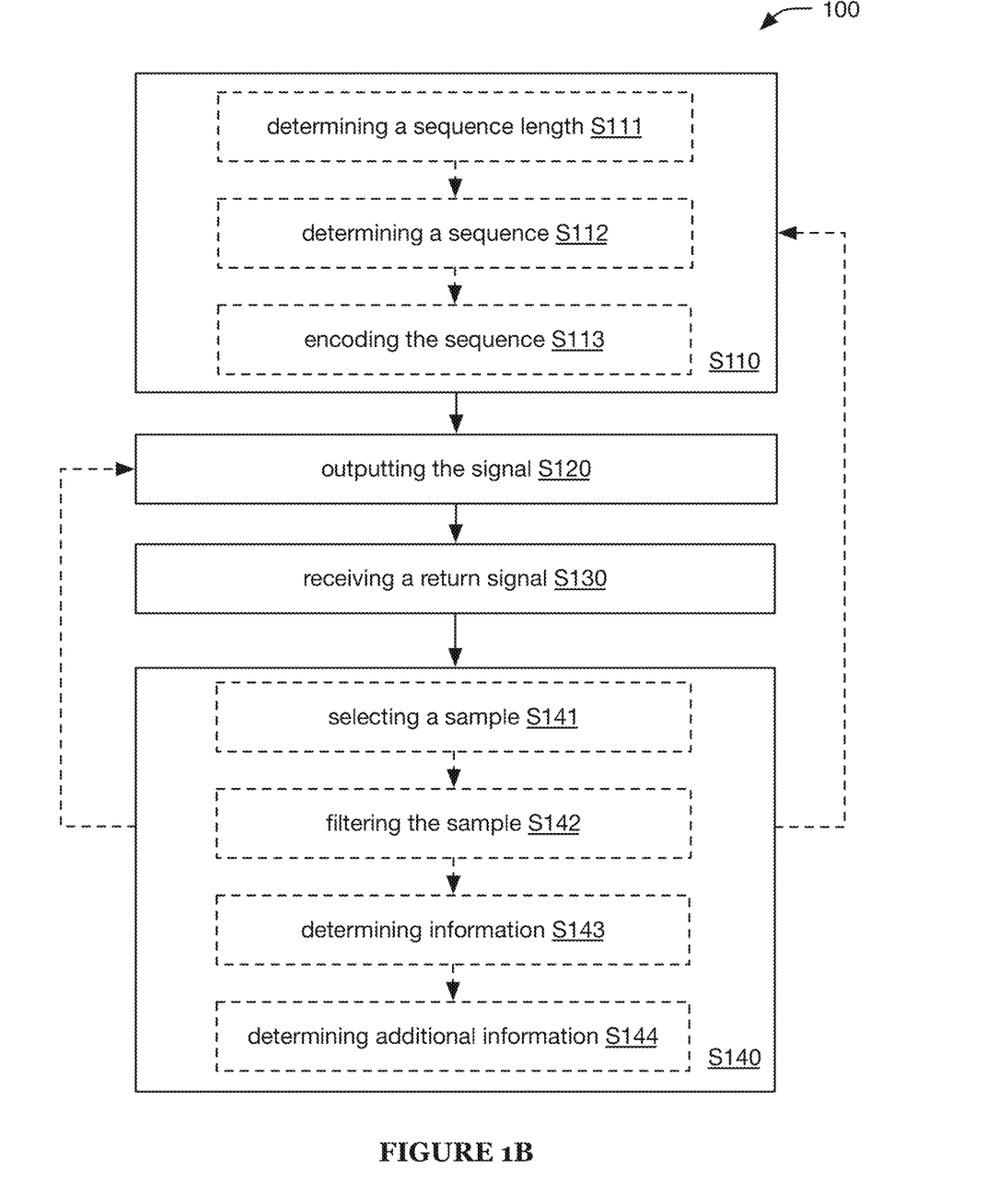

A method 100 of lidar system operation preferably includes: determining a signal S110; outputting the signal S120; receiving a return signal S130; and/or analyzing the return signal S140 (e.g., as shown in FIGS. 1A-1B). However, the method 100 can additionally or alternatively include any other suitable elements performed in any suitable manner. The method 100 is preferably performed using a lidar system 200, but can additionally or alternatively be performed using any other suitable system(s).

2. System.

Figure 2A:
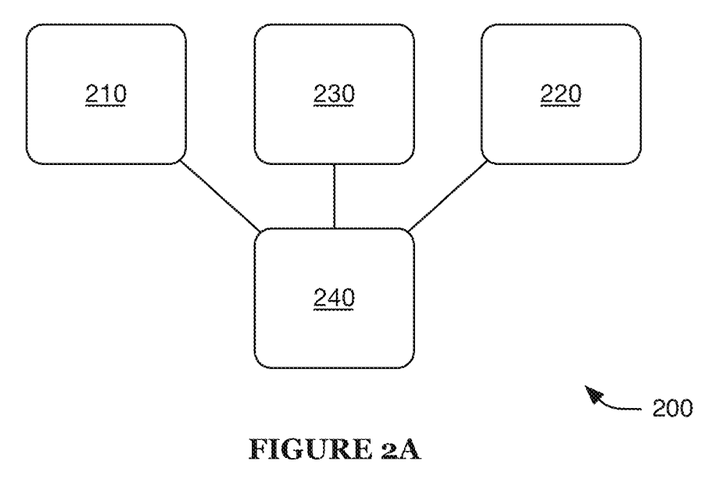
FIG. 2A is a schematic representation of an embodiment of the system.

The lidar system 200 preferably includes one or more: optical emitters 210; optical detectors 220; beam directors 230; and/or processing modules 240 (e.g., as shown in FIG. 2A). However, the system 200 can additionally or alternatively include any other suitable elements in any suitable arrangement.

The optical emitter(s) 210 preferably function to (e.g., are operable to) emit one or more optical signals. The optical signals are preferably beam-like (e.g., laser beams), but can additionally or alternatively have any other suitable optical characteristics.

The optical emitters preferably include one or more lasers (e.g., diode lasers). The lasers can include, for example, edge-emitting lasers, surface-emitting lasers (e.g., VCSELs), fiber coupled lasers, and/or lasers of any other suitable types. The lasers are preferably continuous wave lasers (e.g., operable and/or configured to emit substantially continuous wave radiation) but can additionally or alternatively include pulsed lasers (e.g., operable and/or configured to emit pulses of radiation) and/or any other suitable lasers. In one specific example, one or more of the lasers emit light with a wavelength of substantially 900 nm (e.g., 890-910 nm, 875-925 nm, etc.). In a second specific example, one or more of the lasers emit light with a wavelength of substantially 1550 nm (e.g., 1540-1560 nm, 1525-1575 nm, etc.). In a third specific example, one or more of the lasers emit light with a wavelength of substantially 835 nm (e.g., 820-850 nm, 800-870 nm, etc.). The light intensity emitted by the laser is preferably lower than or equal to the limit prescribed by regulatory standards (e.g., the laser can be compliant with IEC-60825, IEC-62471, etc.), but can alternatively be higher. The signal power can be within regulatory limits (e.g., less than a threshold power, such as 5 W 2 W, 1 W, 500 mW, 200 mW, 100 mW, 50 mW, 20 mW, 10 mW, 5 mW, 2 mW, 1 mW, 0.5 mW, 0.2 mW, or 0.1 mW, etc.), preferably less than 1 mW, but can alternatively be higher or lower. However, the lasers can additionally or alternatively include any other suitable lasers.

Each optical emitter 210 preferably includes one or more modulators. Each modulator is preferably operable to modulate one or more aspects (e.g., phase, intensity, wavelength, etc.) of the light emitted by the emitter. However, the system 200 can additionally or alternatively include any other suitable optical emitters.

The optical detector(s) 220 preferably function to (e.g., are operable to) generate an electrical signal (e.g., current, voltage, etc.) in response to optical detection (e.g., representative of the detected optical signal), but can additionally or alternatively generate any other suitable signal (e.g., representative of the detected optical signal) in response to optical signal detection. For example, the optical detectors can include one or more photodiodes (e.g., avalanche photodiodes). The optical detector(s) 220 can optionally include (and/or be supplemented by) one or more demodulators (e.g., digital demodulators, such as computationally-implemented demodulators; analog demodulator circuits; etc.), such as demodulators complementary to the modulators (e.g., configured to convert the encoded signal back into the original sequence). However, the system 200 can additionally or alternatively include any other suitable optical detectors.

Figure 2B:
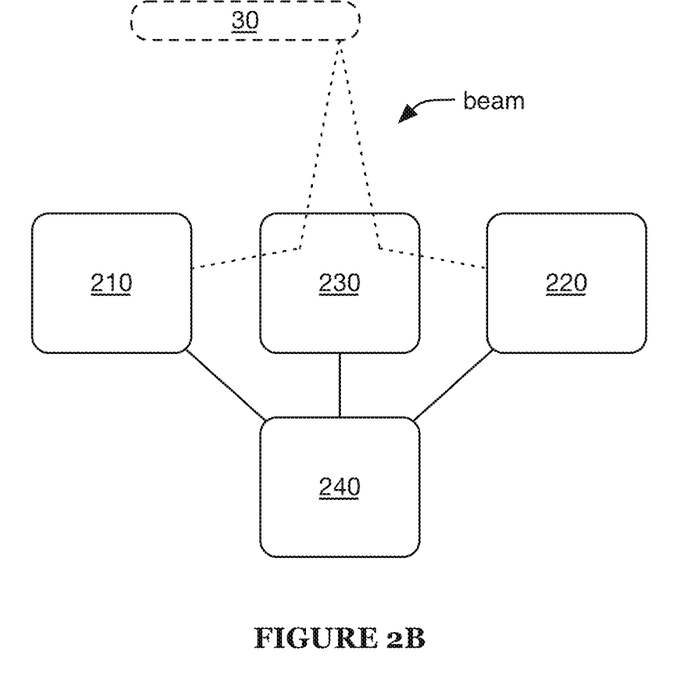
FIG. 2B is a schematic representation of the embodiment of the system in use.

The beam director(s) 230 preferably functions to direct the optical signal(s) between aspects of the system 200 and the external environment. For example, a beam director 230 can direct an emitted optical signal (e.g., beam) from an optical emitter 210 to an external location 30 (within the external environment), wherein the optical signal reflects off the external location 30 (and/or other external locations). The optical signal is preferably reflected back to the beam director 230, which directs the reflected signal to an optical detector 220. However, the optical signal can additionally or alternatively be reflected to another beam director 230 (e.g., which directs the signal to the optical detector 220), to the optical detector 220, and/or to any other suitable element(s) of the system 200. Each beam director 230 can direct one or more emitted signal and one or more reflected signals, and can direct the signals between one or more optical emitters 210, external locations 30, and/or optical detectors 220 (e.g., as shown in FIG. 2B). In one example, the beam director 230 includes one or more mirrors, preferably moving and/or moveable mirrors such as rotating mirrors (e.g., continuously rotating) and/or MEMS-based mirrors (e.g., configured to move in response to control inputs), which can direct the optical signal to many external locations 30 over time (e.g., scanning the beam over the locations as the mirror rotates). However, the system 200 can additionally or alternatively include any other suitable beam directors, or include no beam director.

The processing module(s) 240 preferably function to: control other elements of the system 200, such as the optical emitters 210 (e.g., controlling optical emission and/or modulation) and/or beam directors 230 (e.g., controlling the direction of the beam); receive data from other elements of the system 200, such as the optical detectors 220 (e.g., receiving signals associated with light detection); and/or process (e.g., interpret) the received data, such as to determine information about the external environment (e.g., positions of the external locations 30). The processing module 240 is preferably communicatively (e.g. electronically) coupled to the optical emitters 210, optical detectors 220, beam directors 230, and/or any other suitable elements of the system. The processing module 240 preferably includes one or more processors (e.g., CPU, GPU, microprocessor, FPGA, ASIC, etc.) and/or storage units (e.g., Flash, RAM, etc.), but can additionally or alternatively include any other suitable elements. In some variations, the processing module 240 (and/or a supplementary processing module) can be physically separated from the other elements of the lidar system (e.g., wherein the lidar system includes a communication module, such as a wireless communication module, configured to communicate with the processing module). For example, the processing module 240 can be a remote computing system (e.g., Internet-connected server), and the lidar system can communicate with the remote computing system (e.g., wherein some or all computations of the method are performed by the remote computing system). However, the system 200 can additionally or alternatively include any other suitable processing modules.

3. Method.

3.1 Determining a Signal.

Figure 3A:
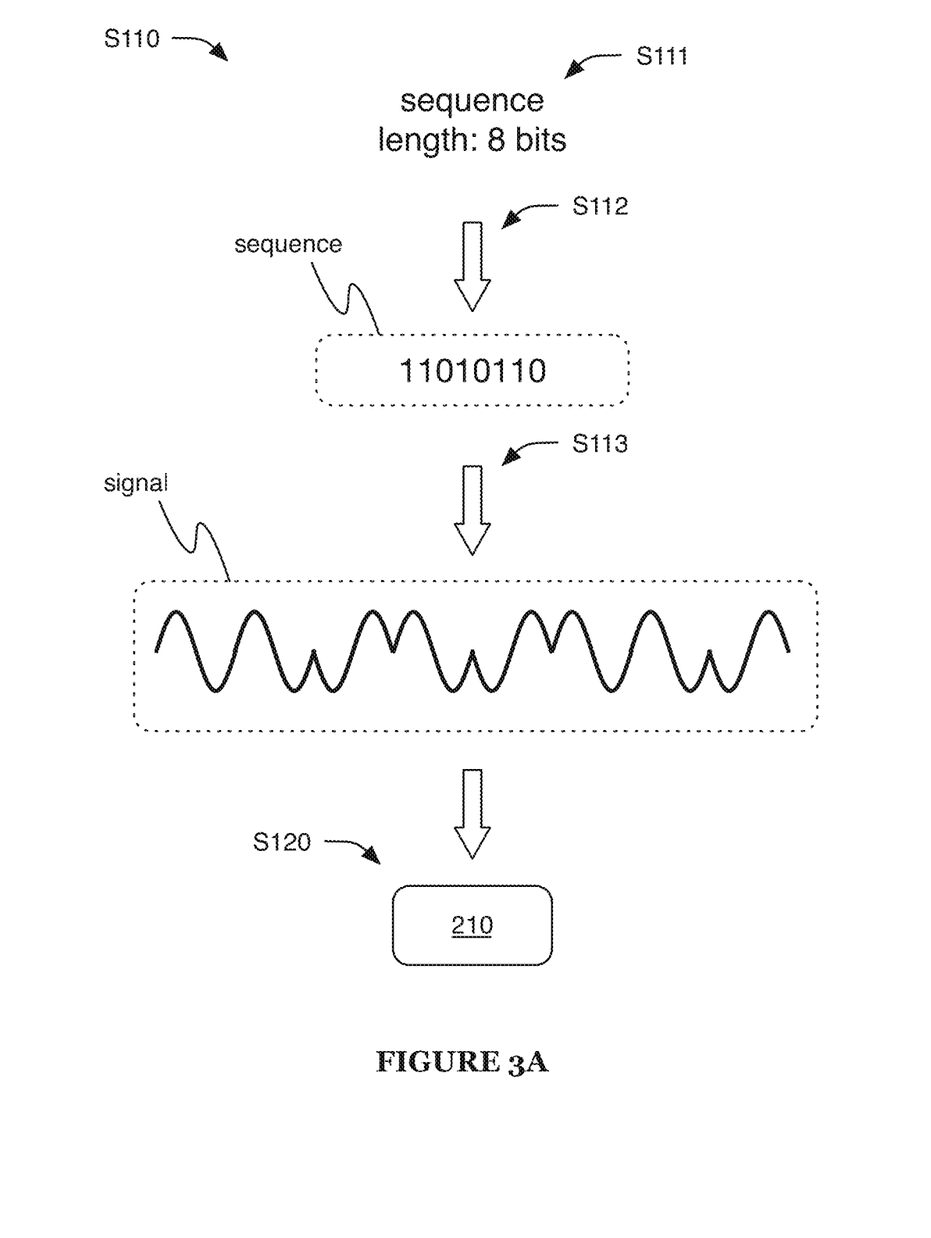
FIGS. 3A-3B are schematic representations of examples of determining signals.

Determining a signal S110 preferably functions to determine the signal that the lidar system outputs, which can function to control various aspects of object detection performance. Determining the signal S110 preferably includes determining a sequence length S111, determining a sequence S112, and/or encoding the sequence S113 (e.g., as shown in FIG. 3A), and can additionally or alternatively include any other suitable elements.

Figure 3B:
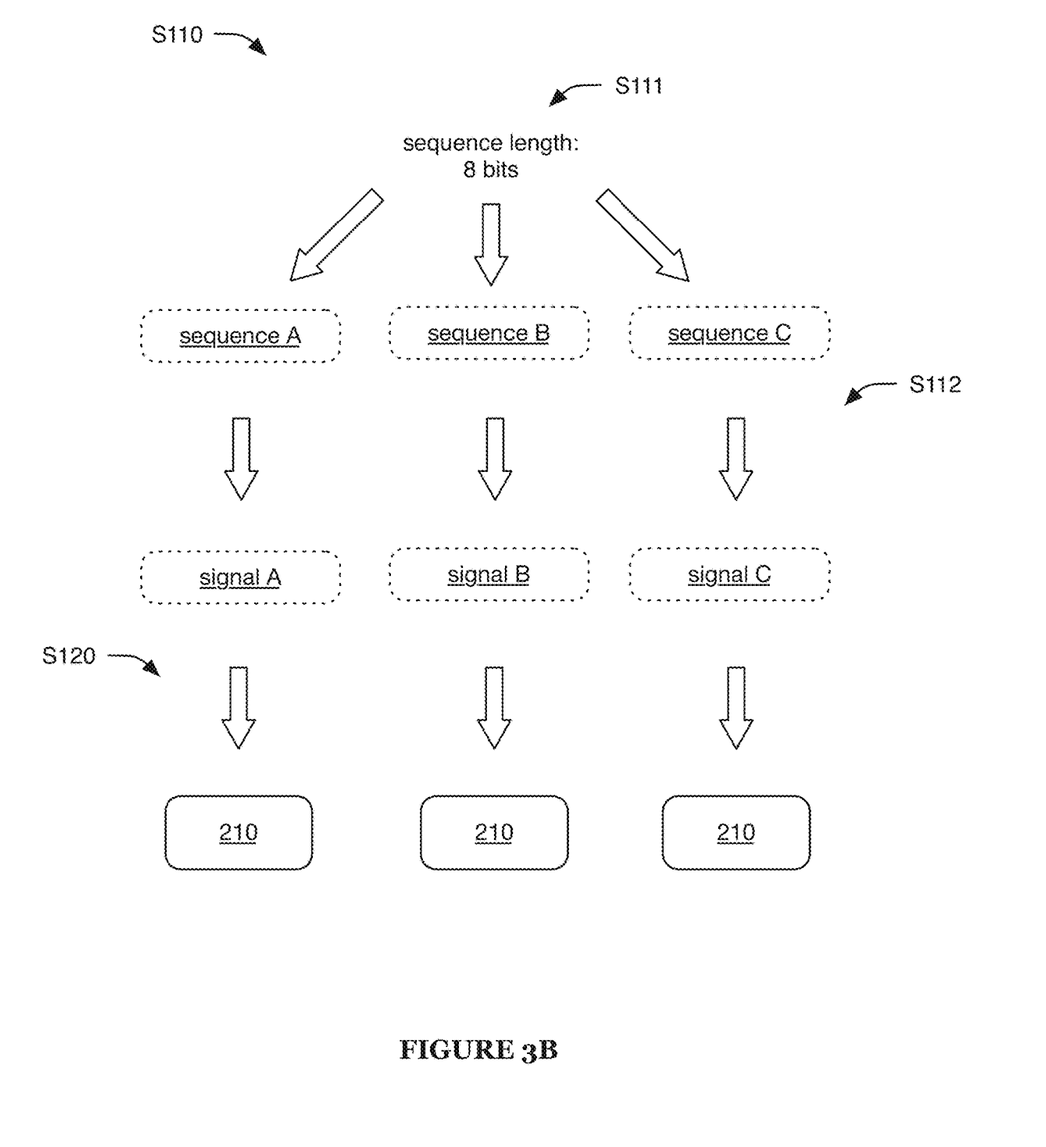

Determining a sequence length 8111 preferably functions to control tradeoffs between various system performance metrics (e.g., as described below in further detail). The sequence length is preferably a bit-length (e.g., wherein the sequence is a binary sequence) but can additionally or alternatively be any other suitable metric associated with sequence size. The same sequence length is preferably used for multiple sequences, such as concurrently-emitted sequences (e.g., wherein a plurality of sequences are output substantially concurrently, such as each output by a different optical emitter of the system; example shown in FIG. 3B) and/or serial sequences (e.g., a time series of multiple sequences, emitted by a single optical emitter of the system). Alternatively, different sequence lengths can be used for a single continuous signal and/or multiple, concurrently-emitted signals.

The sequence length is preferably determined based on one or more desired performance metrics (e.g., to achieve at least a minimum performance level for a first set of metrics, to maximize performance according to a second set of metrics, etc.). The sequence length can be: automatically determined (e.g., selected, calculated, etc.) based on operating context, such as geographic location, system kinematics (e.g., velocity, acceleration), presence of objects detected within a given physical range, performance metric values, and/or other contextual variables; automatically determined based on a set of target performance metric values (e.g., received from a user, determined based on operating context); manually determined; and/or otherwise determined. For example, the method can include: receiving target values for one or more performance metrics, and selecting the sequence length associated with the received performance metric target values (e.g., from a sequence length-performance metric value table or other data structure). The association between the performance metric value and the sequence length can be: predetermined (e.g., calculated, tested), iteratively determined, and/or otherwise determined. In another example, the method can include: adjusting the sequence length until the performance metrics satisfy a set of performance metric target values. However, the sequence length can be otherwise determined.

The performance metrics can include accuracy, range, resolution, latency, power consumption, and/or any other suitable metrics.

Accuracy can include detection failure probability (e.g., "complete miss", such as described in more detail in the appendix), detected distance accuracy (e.g., "Cramer-Rao lower bound" or "CRLB"), and/or any other suitable accuracy metrics. Accuracy is typically improved with longer sequences. In some examples, the sequence length is selected so that the CRLB is less than, no more than, and/or substantially equal to a threshold distance uncertainty, such as 0.1, 0.2, 0.5, 1, 2, 3, 4, 5, 6, 7, 8, 9, 10, 15, 20, 30, 50, 100, 0.01-0.1, 0.1-1, 1-3, 3-7, 7-20, 20-100, or 100-1000 cm. In a specific example, the threshold distance uncertainty is 5 cm (e.g., the sequence length is selected to achieve a CRLB less than or equal to 5 cm).

Range is preferably the maximum distance at which an object can be reliably detected while implementing the method 200 (e.g., without the possibility of an aliasing and/or range ambiguity issue, such as arising from periodicity of the output signal; while maintaining the failure probability below a threshold value, such as less than a 0.1%, 0.2%, 0.5%, 1%, 2%, 5%, or 10% complete miss probability, preferably less than a 1% complete miss probability; while receiving sufficiently strong return signals to reliably perform the method; etc.). Because the signal period typically increases with sequence length (e.g., for a fixed symbol rate, it increases linearly), range typically increases with longer sequences (e.g., wherein, to avoid potential periodic range ambiguity, the range is less than or equal to half the distance that the signal propagates during one period of the signal, corresponding to the round-trip propagation time of the signal reflecting off a maximum-range object). Additionally or alternatively, the effective range may be limited by the strength of the return signals received by the system (e.g., wherein return signals reflected from more distant objects in the environment may be weaker than those reflected from closer objects). An increased sequence length can increase the discrimination power of the matched filter and/or can increase the detection integration time, which can enable more reliable detection of more distant objects (and/or other weakly-returning objects) in the environment. In some examples, the sequence length (and/or other signal parameters, such as symbol rate) is selected so that the range (e.g., ambiguity-limited range, return signal strength-limited range, etc.) is more than, no less than, and/or substantially equal to a threshold distance, such as 50, 100, 150, 200, 250, 275, 300, 325, 350, 400, 450, 500, 600, 10-50, 50-150, 150-450, or 450-1000 m. In a first specific example, the threshold distance is 300 m. In a second specific example, the threshold distance is 200 m, limited by return signal strength, which can correspond to a sequence length that would enable an ambiguity-limited range of 1-5 km (e.g., approximately 2 km).

Latency is preferably the amount of time per sweep (e.g., time between consecutive signal outputs at a particular beam orientation, such as corresponding to beam outputs at all the probed external locations). Latency typically becomes worse (larger) with longer sequences. For example, for a fixed resolution, an increased signal period (e.g., which, for a fixed symbol rate, increases linearly with sequence length) corresponds to a dwell time at each beam orientation, and thus to an increase latency.

Resolution is preferably the angular spacing between adjacent beam directions (e.g., the angle defined between the vectors from the optical emitter to each of two adjacent external locations). Resolution typically becomes poorer (e.g., larger spacing between points) with longer sequences. For example, for a fixed latency, an increased signal period corresponds to fewer beam orientations per sweep (e.g., as the time per sweep must be at least equal to the product of the number of beam orientations per sweep and the signal period).

In some embodiments, the sequence length is selected to be in the range 10-10,000 bits (e.g., between 100 and 5000 bits). However, S111 can additionally or alternatively include determining any other suitable sequence length(s) in any suitable manner.

Determining a sequence S112 preferably functions to determine one or more unique sequences based on the sequence length (e.g., wherein each sequence is of the length determined in S111). Each sequence is preferably a digital sequence, such as a binary sequence, but the sequences can additionally or alternatively include any other suitable sequences.

The sequences are preferably determined to achieve a high degree of orthogonality (e.g., orthogonality between different sequences, orthogonality between encoded signals corresponding to the different sequences, orthogonality to environmental noise, etc.). Accordingly, the sequences are preferably determined to meet the following criteria (and/or a subset of the criteria).

First, each sequence (and/or the corresponding encoded signal, preferably a periodically repeating signal) preferably has high auto-correlation at zero time delay (and, for the corresponding encoded signal, preferably at time delays equal to integer multiples of the encoded signal period) and low (e.g., substantially zero; less than a threshold amount, such as relative to the zero time delay auto-correlation; etc.) auto-correlation away from zero time delay (e.g., more than a threshold time delay; for the corresponding encoded signal, preferably excluding time delays equal to and/or close to, such as within the threshold time of, integer multiples of the encoded signal period).

Second, each sequence (and/or the corresponding encoded signal, preferably a periodically repeating signal) preferably has low (e.g., substantially zero; less than a threshold amount, preferably relative to the zero time delay auto-correlation and/or to any other suitable reference value, such as less than 0.1%, 0.2%, 0.5%, 1%, 2%, 5%, 10%, 20%, 30%, or 50% of the reference value; etc.) cross-correlation with other signals present in the system's environment (e.g., signals that may be detected by the detector; other signals that are output by the system, such as signals corresponding to other such sequences; constant and/or substantially-constant signals, such as from a steady state light source; etc.). This low cross-correlation can enable discrimination between the detected signals (e.g., following reflection of an output signal off an external location), such as by code-division multiple access (CDMA) techniques (e.g., asynchronous CDMA) and/or other techniques.

In some embodiments, S112 includes determining multiple sequences (e.g., each associated with a different emitter, such as different emitters of the system, of different systems, etc.), preferably each having the same sequence length (e.g., a single sequence length determined in S111). In such embodiments, the sequences are preferably determined to all satisfy the above criteria. In a first example, the sequences are selected from a set of Gold codes and/or other predetermined sequences with high orthogonality. In a specific example, the sequences are selected from a set of predetermined sequences for a given sequence length (e.g., orthogonal sequences or Gold codes having a given sequence length), wherein the sequence length can be determined based on the target performance metrics. In this example, the system can maintain a database of orthogonal sequence sets for each of a plurality of sequence lengths. The database can optionally include a matched filter set for each orthogonal sequence set (e.g., Fourier transforms and/or discrete Fourier transforms of each of the sequences and/or corresponding encoded signals). In a second example, the sequences are pseudorandom sequences (e.g., pseudorandom binary sequences), such as maximum length sequences. In a third example, the sequences are determined using one or more optimization techniques (e.g., stochastic optimization technique, such as simulated annealing) based on one or more of the criteria (preferably, based on a cost function associated with all the criteria). In a specific example of the third example, iterations of the optimization technique are applied until all sequences (and/or the corresponding encoded signals) achieve a minimum threshold degree of orthogonality. However, the sequences can additionally or alternatively be determined in any other suitable manner.

Encoding the sequence S113 preferably functions to generate an encoded signal based on the sequence (e.g., for each sequence determined in S112, generating a corresponding encoded signal). The generated signal is preferably periodic, repeating the encoded sequence, more preferably wherein there is no (or substantially no) temporal gap between sequence repeats (e.g., wherein the encoded sequence restarts as soon as the previous iteration ends).

The sequence can be encoded using a modulation method (or multiple methods), preferably a digital modulation method (e.g., onto a carrier signal such as a sinusoid). The modulation method is preferably a phase-shift keying (e.g., BPSK, QPSK, 8-PSK, higher order PSK, etc.), but can additionally or alternatively include quadrature amplitude modulation (QAM), frequency-shift keying (FSK), amplitude-shift keying (ASK), and/or any other suitable modulation method. Alternatively, no carrier signal and/or modulation method can be used (e.g., directly mapping bits and/or symbols to output intensities, such as mapping 0 bits to a low or substantially zero intensity and mapping 1 bits to a high intensity; etc.).

Encoding the sequence S113 can optionally include determining an encoding frequency (e.g., symbol rate). For example, reducing the encoding frequency can reduce the computational load associated with elements of the method (e.g., S140 and/or S150), thereby reducing power consumption and/or enabling use of a less performant processing module (e.g., in systems that include or can include multiple different processing modules; corresponding to a permanent reduction in encoding frequency to enable use of less expensive and/or complex hardware; etc.). However, reducing the encoding frequency can also affect other performance metrics. For example, given a fixed sequence length, a reduced encoding frequency will typically result in a worse CRLB, resolution, and/or latency (but may also result in an increased range, due to increased dwell time at each beam orientation). The same encoding frequency is preferably used for all sequence encodings performed in S113, but alternatively different sequences can be encoded using different encoding frequencies. In a first example, determining the encoding frequency includes selecting one of two frequencies, such as either a high-performance frequency (e.g., 50, 75, 100, 125, 150, 200, 500, 1000, 50-200, 200-1000, or 1000-5000 MHz) or a low-power frequency (e.g., 5, 10, 20, 50, 75, 100, 1-10, 10-60, or 60-200 MHz). In a second example, determining the encoding frequency includes selecting a frequency in a range between the high-performance frequency and the low-power frequency. Alternatively, a fixed encoding frequency (e.g., 10, 20, 50, 75, 100, 125, 150, 200, 500, 1000, 1-10, 10-60, 60-200, 200-1000, or 1000-5000 MHz) can be used, such as a fixed 100 MHz frequency, and/or the encoding frequency (or frequencies) can be determined in any other suitable manner.

However, S110 can additionally or alternatively include determining the signal(s) in any other suitable manner.

3.2 Outputting the Signal.

Outputting the signal S120 preferably functions to emit an output (e.g., a beam, preferably a beam of light) that includes the signal to be output (e.g., the signal determined in S110). S120 can include controlling a transducer, preferably an optical emitter such as described above (e.g., a laser), to output the signal. For example, a modulator (e.g., as described above, such as regarding the system 200) can be employed to include the signal in the output. S120 preferably includes continuously outputting the signal (e.g., for a periodic signal), but can alternatively include outputting the signal a single time and/or any other suitable number of times with any suitable timing. In embodiments including multiple transducers (e.g., multiple optical emitters, such as multiple lasers), S120 preferably includes emitting multiple outputs, more preferably concurrently or substantially concurrently (e.g., emitting all the outputs continuously or substantially continuously, emitting pulsed and/or sporadic outputs at substantially the same time as each other, etc.). However, the multiple outputs can additionally or alternatively be emitted with any other suitable timing.

During S120, the beam director is preferably controlled to direct the output signal toward one or more external locations 30 (e.g., as described above, such as regarding the system 200). Upon reaching the external location(s), the beam can be reflected (e.g., back toward the system). In one example, the beam director can be controlled to direct the beam substantially in a first direction over a first dwell time interval (e.g., substantially equal to one period of the signal), then in a second direction over a second dwell time interval, preferably substantially equal in duration to the first dwell time interval, and so on, eventually substantially returning to the first direction and repeating continuously (e.g., until the output parameters, such as sequence length, resolution, symbol rate, etc., are altered).

However, S120 can additionally or alternatively include outputting the signal(s) in any other suitable manner.

3.3 Receiving a Return Signal.

Receiving a return signal S130 preferably functions to detect one or more reflections of the output signal (e.g., from one or more objects within an environment surrounding the system, such as objects at the external location(s)). The signal can be received at a transducer (e.g., of the system, such as close to and/or otherwise collocated with the optical emitter or other output transducer of the system), preferably an optical detector (e.g., photodiode, such as an avalanche photodiode (APD), etc.), such as described above regarding the system 200. In some embodiments (e.g., wherein multiple signals are output substantially concurrently), multiple signals (e.g., reflections of different output signals, different reflections of a single output signal, etc.) can be received at the transducer during S130 (e.g., received substantially concurrently and/or otherwise temporally overlapping). The return signal is preferably a reflection (e.g., direct reflection, specular reflection, etc.) of the output signal. However, S130 can additionally or alternatively include receiving any return signal associated with (e.g., induced by) the output signal, and/or receiving any other suitable signals.

The received signal(s) are preferably sampled (e.g., by a circuit, such as an analog-to-digital converter circuit, that samples an electrical output of the transducer, such as the current and/or voltage generated by the transducer in response to reception of the received signals) at a sufficient rate to resolve the signal(s), such as sampling at a rate at least twice the bandwidth of the anticipated signal(s). In one example, the received signals are sampled at a rate of at least 2.5 times the symbol rate of the output signals (e.g., for a 100 MHz symbol rate, corresponding to a 125 MHz output signal bandwidth, sampling at a rate of at least 250 MHz).

However, the return signal can additionally or alternatively be received in any other suitable manner.

3.4 Analyzing the Return Signal.

Figure 4A:
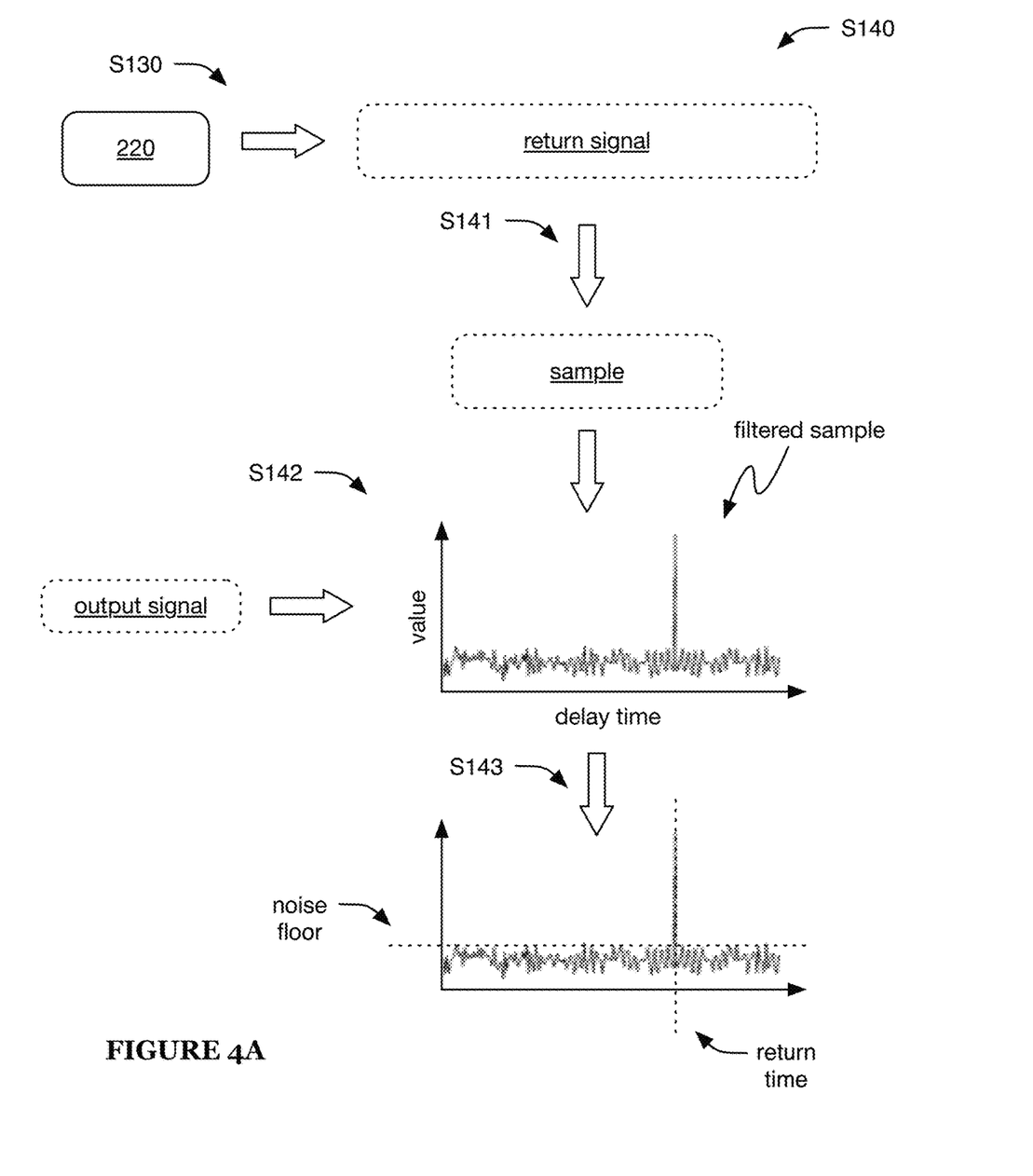
FIGS. 4A-4B are schematic representations of examples of analyzing return signals.

Analyzing the return signal S140 preferably functions to determine the position of one or more external locations (e.g., off of which the signal was reflected) relative to the system. Analyzing the return signal S140 preferably includes selecting a sample from the return signal S141, filtering the sample S142, and/or determining information based on the signal S143 (e.g., as shown in FIG. 4A). However, analyzing the return signal S140 can additionally or alternatively include determining additional information S144 and/or any other suitable elements.

Selecting a sample from the return signal S141 preferably functions to select a portion of the return signal for analysis. The selected sample is preferably a contiguous window of the received signal. The sample window is preferably sufficiently long in duration to capture an entire period of the output signal. In one example, the sample duration is preferably no less than the sum of the signal period (e.g., equal to the sequence length divided by the symbol rate) and the maximum propagation delay (e.g., equal to twice the range divided by the speed of signal propagation, such as the speed of light in the environment surrounding the system, which corresponds to the round-trip propagation time for an output signal that reflects off an external location at a distance equal to the range). However, S141 can additionally or alternatively include selecting a window of any other suitable duration, and/or selecting any other suitable sample.

Filtering the sample S142 preferably functions to isolate portions of the sample associated with (e.g., substantially matching) the corresponding output signal. S142 preferably includes performing a digital filtering process (e.g., performed computationally), such as implemented by a processing module (e.g., as described above). However, S142 can additionally or alternatively include otherwise performing the filtering process (e.g., analog and/or digital filtering process, such as one implemented by a filter circuit). The filter applied to the sample is preferably a matched filter (or substantially matched filter) for the corresponding output signal, but can additionally or alternatively be any other suitable filter.

In one embodiment, S142 includes determining a convolution (e.g., circular convolution) of the output signal with the sample, preferably wherein one of the two are time-reversed (e.g., convolution of a time-reversed version of the periodic output signal with the sample, or convolution of the periodic output signal with a time-reversed version of the sample), such as a circular convolution of a time-reversed version of the periodic output signal with the sample. For example, determining the convolution can include: determining a Fourier transform (e.g., discrete Fourier transform, such as the FFFT) of the sample, determining a Fourier transform (e.g., discrete Fourier transform) of the output signal (and/or retrieving a previously-determined Fourier transform of the output signal, such as one determined for a prior iteration of S142), multiplying the transformed output signal with the transformed sample, and determining an inverse Fourier transform (e.g., inverse discrete Fourier transform) of the product (which is the convolution of the two).

S142 preferably generates a filtered sample that is a function of delay time. The filtered sample is typically a discrete function (e.g., the sample and/or output signal includes data only at discrete points in time, the calculation is performed at discrete points in delay time, etc.) but can alternatively be a continuous function and/or any other suitable function.

S142 can optionally include zero-padding the sample (e.g., wherein one or more zero-valued points are inserted into the sample, such as between each observed point of the sample determined in S130). The sample can be zero-padded before performing the filtering, and/or the filtered sample can be zero-padded after filtering.

However, S142 can additionally or alternatively include filtering the sample in any other suitable manner.

Determining information based on the signal S143 preferably functions to detect the presence and/or absence of (and/or to determine information, such as distance, optical properties, etc., regarding) objects in the environment (e.g., the external locations off of which the output signal is reflected). S143 is preferably performed based on the filtered sample generated in S142, but can additionally or alternatively be performed using the as-received sample selected in S141 and/or any other suitable information associated with the signal (e.g., received signal).

S143 can optionally include determining a noise floor of the sample. The noise floor can be determined based on the sample selected in S141, based on a calibration sample, preferably collected while the output signal is not being emitted (e.g., while no output signals are being emitted, when all other output signals are being emitted, etc.), based on any other suitable sample, estimated (e.g., based on typical conditions), and/or determined in any other suitable manner. The noise floor can be determined based on (e.g., equal to) a measure (e.g., median, average, alpha-trimmed average, inter-quartile average, etc.) of a power spectrum of the sample used to determine the noise floor (e.g., the sample selected in S141, the calibration sample, etc.).

S143 preferably includes determining a delay time corresponding to an extremum of the data (e.g., a maximum of the sample, preferably the filtered sample). This delay time is preferably determined using one or more interpolation techniques (e.g., wherein the determined delay time corresponds to the maximum-valued interpolated point). Such interpolation can have several benefits, including, for example, improving detection accuracy and/or enabling CRLB estimation.

For example, S143 can include determining an interpolated delay time (e.g., corresponding to an extremum of the interpolated data) by performing a continuous curve interpolation (e.g., parabolic interpolation, polynomial interpolation such as using a polynomial of order 2, 3, 4, 5, 6, 7-10 or any other suitable order polynomial, sinc function interpolation, Taylor-series interpolation, etc.), a discrete Fourier transform-based interpolation (e.g., zero-padding a frequency spectrum associated with a discrete Fourier transform of the data, convolving the zero-padded frequency spectrum with an interpolation kernel such as a sine function kernel, and generating interpolated time domain data by determining an inverse discrete Fourier transform of the convolution), and/or any other suitable interpolation technique(s). The interpolation is preferably performed using only (or substantially only) linear computational operations, which can enable rapid computation, but can additionally or alternatively be performed using any other suitable operations. The delay time can additionally or alternatively be determined using one or more regression techniques (e.g., to determine a continuous curve, such as a curve of one of the types described above regarding interpolation and/or any other suitable type of curve, that fits the data or a subset thereof, such as a subset near the extremum).

S143 can optionally include applying a delay time correction (e.g., after interpolation and/or regression). For example, the method can include correcting the interpolated delay time based on a correction relationship (e.g., predetermined relationship, such as determined during a system calibration, fixed for all such systems, etc.) between the interpolated delay time and the corrected delay time, such as a relationship associated with an analytical curve (e.g., polynomial, such as a polynomial of order 2, 3, 4, 5, 6, 7-10 or any other suitable order polynomial) and/or a numerical relationship (e.g., stored in a lookup table).

In one example, the interpolated delay time is determined by performing a parabolic interpolation using three data points: the extremal data point and the point neighboring the extremal data point on either side. In a variation of this example, the interpolated delay time is then corrected based on a polynomial correction relationship (e.g., associated with a sixth-order polynomial of the interpolated delay time).

However, S143 can alternatively include determining the delay time without interpolation (e.g., wherein the determined delay time is the time corresponding to the maximum-valued discretized point of the sample), and/or determining the delay time in any other suitable manner. In embodiments in which a noise floor is determined, if the determined delay time corresponds to a point exceeding the noise floor (e.g., greater than the noise floor, a value proportional to the noise floor, greater by more than a threshold amount, etc.; considering a single point, a peak including at least a threshold number of points, etc.), the delay time can be considered to represent a return (e.g., detection event), whereas points not exceeding the noise floor are preferably not considered to represent returns. If no noise floor is determined, any delay time determined as described here is preferably considered to represent a return.

This delay time (e.g., if considered to represent a return) corresponds to the propagation time of the output signal (e.g., time between emission from the optical emitter and reception at the optical detector). Thus, the delay time typically corresponds to the distance to the external location from which the beam reflected (e.g., wherein the delay time is equal to twice the distance divided by the signal propagation speed, typically the speed of light).

The information determined in S143 (e.g., delay time and/or distance corresponding to each return) is preferably stored in association with information associated with the detected object orientation with respect to the system (e.g., the beam direction). For example, the relative location of the object with respect to the system can be stored (e.g., wherein many such returns result in the determination and/or storage of a point cloud representing the environment surrounding the system, such as stored as a point in 3-dimensional space (e.g., wherein the origin of the space represents the system). Optionally, other information can be stored in association with this information, such as the corresponding value (e.g., of the raw and/or interpolated sample), phase information, and/or any other suitable information.

However, S143 can additionally or alternatively include determining any other suitable information in any suitable manner.

S140 can optionally include determining additional information S144. In some embodiments, S144 can function to detect multiple extrema (e.g., corresponding to multiple reflections) in a single sample. For example, S144 can enable recognition of "multi-return" events (e.g., wherein a beam is incident on the edge of an object, and thus a first portion of the beam is reflected by the object which a second portion of the beam continues on, possibly to be reflected by a second object; wherein a beam is incident on a semi-transparent object, and thus the beam is partially reflected by the object and partially transmitted through the object, possibly to be reflected by a second object; etc.). Preferably, S144 includes detecting all discernable extrema of interest (e.g., maxima above the noise floor).

Figure 5:
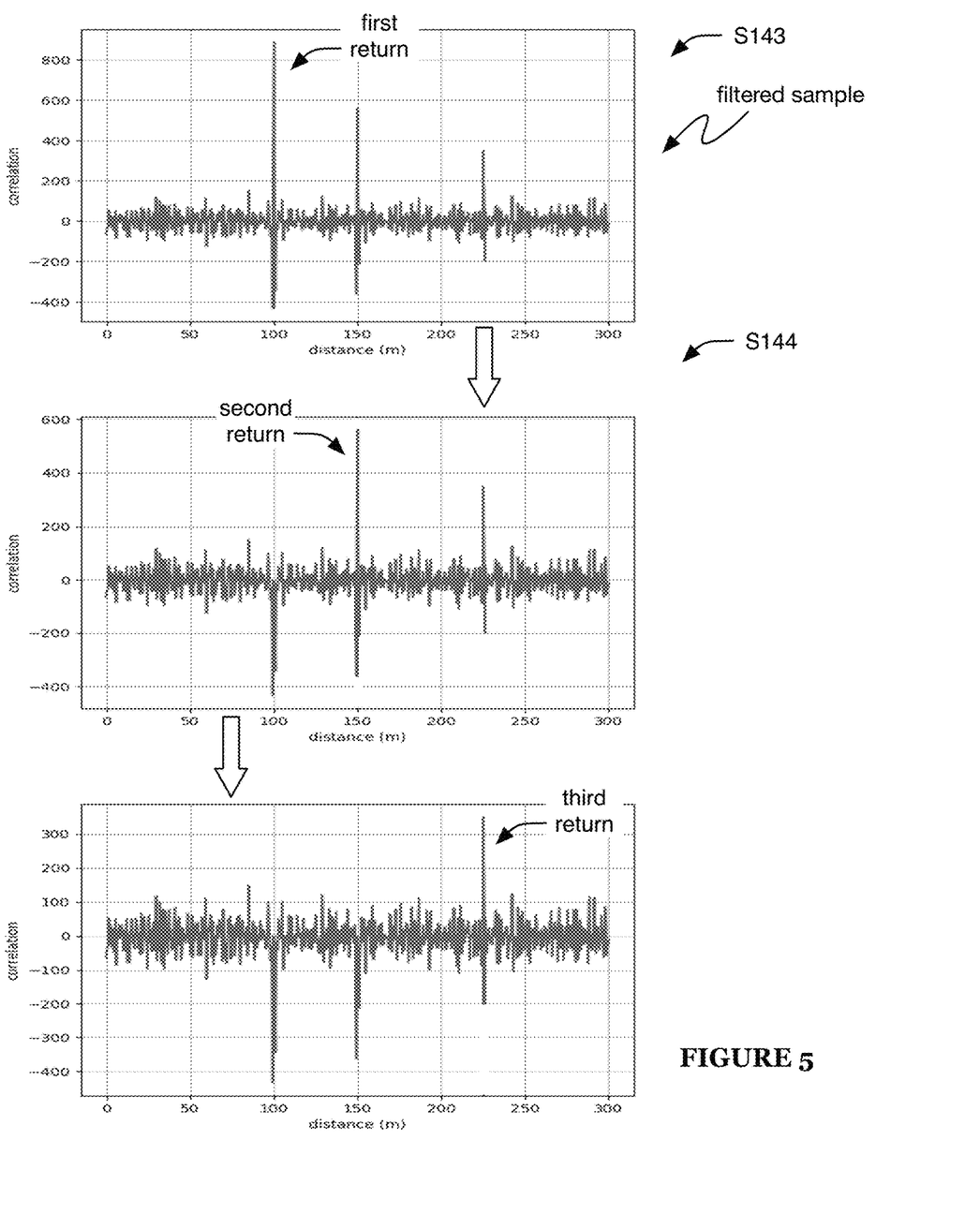
FIG. 5 is a schematic representation of a specific example of analyzing a return signal.

In one embodiment, S144 includes, after performing S143, altering the sample (e.g., filtered sample) to remove the peak that includes the delay time determined in S143 (e.g., as shown in FIG. 5). In a first example, removing the peak includes selecting the peak by finding the nearest local minimum on each side of the determined delay time (which corresponds to the maximum), and altering all data between those minima (e.g., setting all values between the minima to zero, linearly interpolating between the minima, etc.). In a second example, removing the peak includes performing a peak-fitting procedure to select the peak (e.g., determining a peak fit function corresponding to the peak), then subtracting the peak fit values (e.g., values of the peak fit function) from the corresponding points of the sample. In a third example, removing the peak includes approximating a selection of the peak by selecting a window of points (e.g., predetermined number of points, predetermined delay time window, etc.) on each side of the determined delay time (preferably including the point at the determined delay time), and altering all data within the window (e.g., setting all values between the minima to zero, linearly interpolating between the points just outside either side of the window, etc.). However, the peak can additionally or alternatively be removed (and/or otherwise diminished, marked to be ignored, etc.) in any other suitable manner.

In this embodiment, after removing the peak, S143 is repeated using the altered sample (e.g., wherein this repetition of S143 can determine a second delay time, corresponding to the maximum value of the altered sample). The process of removing peaks and then repeating S143 using the newly-altered sample is preferably repeated until no additional returns are found (e.g., all peaks that exceed the noise floor have been removed).

In a second embodiment, S144 includes performing a modified version of S143 in which multiple extrema (e.g., in the filtered sample) and/or associated delay times are determined substantially concurrently (e.g., all determined during a single pass through the filtered sample). In this embodiment, S144 is preferably performed instead of S143, but can additionally or alternatively be performed after S143 and/or with any other suitable timing. In this embodiment, S144 preferably includes searching the filtered sample for local extrema (preferably maxima, but optionally minima), wherein the first several or top (e.g., largest or smallest magnitude) several extrema are stored. In an example of this embodiment, a specific number of buffers are designated for storing information associated with the extrema (e.g., delay time, magnitude, etc.). Upon finding an extremum, the associated information is stored in an empty buffer. In a first variation, if no empty buffers remain, and the search for extrema terminates (e.g., and S144 is complete). In a second variation, if no empty buffers remain, the magnitude of the current extremum is compared to the least significant (e.g., for maxima, smallest magnitude) stored extremum; if the current extremum is more significant, its associated data is stored in the buffer, replacing the previously-stored information associated with the less significant extremum.

However, S144 can additionally or alternatively include determining any other suitable information in any suitable manner.

Figure 4B:
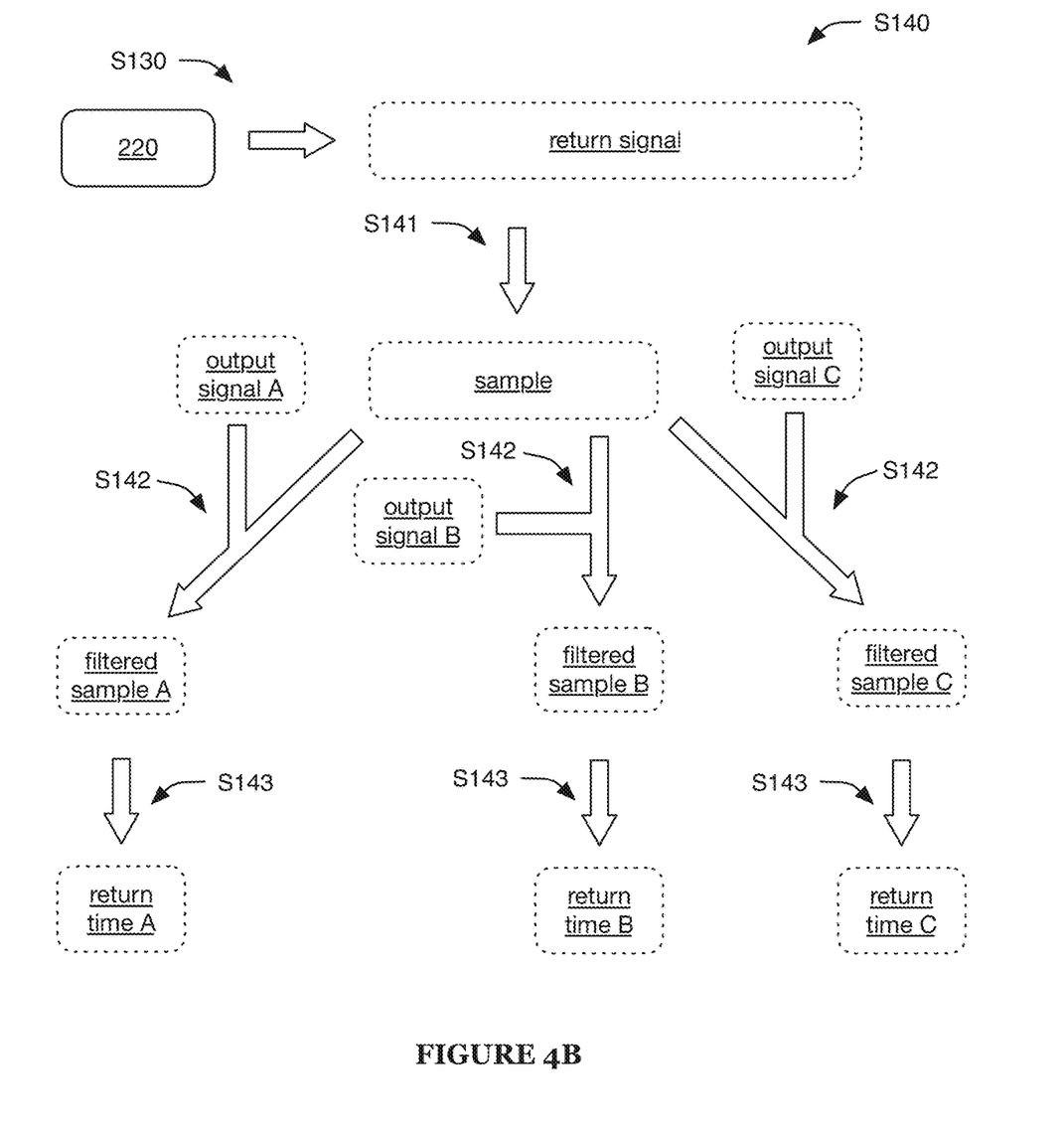

In embodiments in which multiple signals are output concurrently and/or close in time (e.g., wherein several such signals may be received concurrently in S130), S140 is preferably performed for each such output signal (e.g., as shown in FIG. 4B). For example (e.g., wherein the sequence length and symbol rate for all the signals is equal), a single sample can be selected (as described above regarding S141) for all such output signals, and then some or all remaining elements of S140 (e.g., S142, S143, S144, etc.) can be performed (e.g., independently) for each such output signal, using the same sample. Because the different output signals preferably have high mutual orthogonality (e.g., as described above), a high degree of discrimination between the different output signals can be enabled by this method (e.g., wherein most noise associated with the other output signals is filtered out in S142). Embodiments of the method can additionally or alternatively achieve high mutual interference immunity (e.g., immunity to interference from noise originating from other sources, such as from other lidar systems and/or any other suitable emitters), especially for longer sequence lengths, as these noise sources will also typically have reasonable high orthogonality to the output signals used by the lidar system.

However, S140 can additionally or alternatively include any other suitable elements performed in any suitable manner.

3.5 Repeating Elements of the Method.

The method 100 can optionally include repeating one or more of the elements described above. One embodiment includes performing S120 and/or S130 (e.g., continuously performing S120 and S130, preferably substantially concurrently), preferably while repeating S140 and/or changing the beam direction (e.g., sweeping the beam around the environment, such as described above). In this embodiment, all or substantially all of the signal received in S130 is preferably analyzed over the iterations of S140 (e.g., wherein for each iteration of S140, a different sample of the received signal, preferably the sample immediately following the previous sample, is used).

In a variation of this embodiment, some or all elements of S110 can optionally be repeated (e.g., periodically, such as after a threshold period of time, a threshold number of iterations of S140, a threshold number of sweeps of the beam, etc.; sporadically; in response to triggers; etc.), wherein S120, S130, and/or S140 can continue to be performed (e.g., based on the new sequence(s) determined in the most recent iteration of S110). In a first example of this variation, a new sequence length is selected (e.g., to alter some or all of the performance metrics, such as accuracy, range, resolution, latency, etc.), such as described above regarding S111, after which S112 is performed based on the new sequence length. In a second example, a new sequence (or sequences) is selected (e.g., as described above regarding S112) using the same sequence length as before. This second example can optionally be performed if the sequence orthogonality (e.g., to external noise sources, such as noise from other lidar systems) is suspected to be poor (e.g., if signal discrimination performance is poor). For example, if another nearby lidar system (e.g., mounted to a vehicle operating near the present lidar system) is using one or more output signals similar to (e.g., not sufficiently orthogonal to) one or more of the current output signals of the present lidar system, the method may not achieve sufficient immunity to this interference source. Thus, by changing the sequence(s), greater mutual interference immunity may be achieved. This second example can additionally or alternatively be performed periodically, sporadically, and/or with any other suitable timing (e.g., changing operation to diagnose whether the system is operating as desired), and/or performed for any other suitable reason.

However, the method 100 can additionally or alternatively include repeating any other suitable elements with any suitable timing.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for environment mapping, comprising:
   determining a code sequence;
   after determining the code sequence, generating a periodic laser output representative of a periodic output signal that encodes the code sequence, comprising modulating a substantially continuous-wave carrier signal based on the code sequence;
   throughout a time period, continuously transmitting the periodic laser output into an environment;
   during the time period, at an optical sensor, receiving a return signal comprising a reflection, from an object within the environment, of the periodic laser output wherein the code sequence is determined such that a cross-correlation between the periodic output signal and other optical signals received at the optical sensor is less than a threshold value;
   determining a sample indicative of a contiguous time window of the return signal, wherein a duration of the contiguous time window is greater than a period of the periodic output signal;
   generating a filtered sample, comprising filtering the sample based on the code sequence;
   based on the filtered sample:
     determining an extremum of the filtered sample; and
     determining a delay time associated with the extremum; and
   based on the delay time, determining a relative location of the object.

2. The method of claim 1, wherein filtering the sample based on the code sequence comprises applying, to the sample, a matched filter for the periodic output signal.

3. The method of claim 2, wherein applying the matched filter comprises determining at least one of: a circular convolution of the sample with a time-reversed version of the periodic output signal; or a circular convolution of the periodic output signal with a time-reversed version of the sample.

4. The method of claim 1, wherein determining the delay time comprises:
   determining an interpolated sub-sample comprising the extremum; and
   determining the delay time based on the interpolated sub-sample.

5. The method of claim 4, wherein determining the interpolated sub-sample comprises performing a continuous curve interpolation.

6. The method of claim 1, wherein the return signal further comprises a second reflection, from a second object within the environment, of the periodic laser output, the method further comprising:
   based on the filtered sample, determining a second delay time associated with the second object; and
   based on the second delay time, determining a relative location of the second object.

7. The method of claim 6, further comprising, before determining the second delay time, determining a first peak region associated with the extremum; wherein determining the second delay time comprises:
   determining a second extremum of the filtered sample, wherein the second extremum is not within the first peak region, wherein a magnitude of the extremum is greater than a magnitude of the second extremum; and
   determining the second delay time based on the second extremum.

8. The method of claim 1, further comprising:
   at the optical sensor, after receiving the return signal, receiving a second return signal comprising a second reflection, from a second object within the environment, of the periodic laser output;
   determining a second sample indicative of a second contiguous time window of the second return signal;
   generating a second filtered sample, comprising filtering the second sample based on the code sequence;
   based on the second filtered sample, determining a second delay time associated with a second extremum of the filtered sample; and
   based on the second delay time, determining a relative location of the second object.

9. The method of claim 1, further comprising:
   generating a second periodic laser output encoding a second periodic output signal, comprising modulating a second substantially continuous-wave carrier signal based on a second code sequence;
   throughout the time period, continuously transmitting the second periodic laser output into the environment;
   generating a second filtered sample, comprising filtering the sample based on the second code sequence, wherein the return signal further comprises a second reflection, from a second object within the environment, of the second periodic laser output;
   based on the second filtered sample:
      determining a second extremum of the second filtered sample; and
      determining a second delay time associated with the second extremum; and
   based on the second delay time, determining a relative location of the second object.

10. The method of claim 1, wherein modulating the substantially continuous-wave carrier signal based on the code sequence comprises encoding the code sequence using a phase-shift keying.

11. The method of claim 1, further comprising, before determining the code sequence:
   selecting a candidate code sequence;
   generating a candidate laser output representative of a candidate output signal that encodes the candidate code sequence;
   transmitting the candidate laser output;
   at the optical sensor, receiving a test signal; and
   based on the test signal, determining that a test cross-correlation between the candidate output signal and the other optical signals is greater than the threshold value;
   wherein the code sequence is determined in response to determining that the test cross-correlation is greater than the threshold value.

12. The method of claim 1, further comprising:
   before the time period:
      based on a first set of desired performance metrics, determining a first sequence length, wherein the first set of desired performance metrics comprises at least one of: accuracy, range, resolution, and latency; and
      determining the code sequence based on the first sequence length, wherein a length of the code sequence is equal to the first sequence length;
   based on the return signal, determining a second sequence length;
   determining a second code sequence based on the second sequence length, wherein a length of the second code sequence is equal to the second sequence length;
   generating a second periodic laser output representative of a second periodic output signal that encodes the second code sequence, comprising modulating the substantially continuous-wave carrier signal based on the second code sequence;
   throughout a second time period following the time period, continuously transmitting the second periodic laser output into the environment;
   during the second time period, at the optical sensor, receiving a second return signal comprising a second reflection, from the object, of the second periodic laser output;
   determining a second sample indicative of a second contiguous time window of the second return signal;
   generating a second filtered sample, comprising filtering the second sample based on the second code sequence;
   based on the second filtered sample:
      determining a second extremum of the second filtered sample; and
      determining a second delay time associated with the second extremum; and
   based on the second delay time, determining an updated relative location of the object.

13. A method for environment mapping, comprising:
   before a time period, determining a first code sequence and a second code sequence;
   generating a first periodic optical output representative of a first periodic output signal, comprising modulating a first substantially continuous-wave carrier signal based on a first code sequence;
   generating a second periodic optical output representative of a second periodic output signal, comprising modulating a second substantially continuous-wave carrier signal based on a second code sequence, wherein the first and second code sequences are determined such that a cross-correlation between the first and second periodic output signals is substantially zero;

throughout the time period, continuously transmitting the first and second periodic optical outputs into an environment;

during the time period, at an optical sensor, receiving a return signal, the return signal comprising:
- a first reflection, from a first object within the environment, of the first periodic optical output; and
- a second reflection, from a second object within the environment, of the second periodic optical output;

determining a sample by selecting a contiguous time window of the return signal;

generating a first filtered sample, comprising filtering the sample based on the first code sequence;

determining a first delay time associated with the first filtered sample;

based on the first delay time, determining a relative location of the first object;

generating a second filtered sample, comprising filtering the sample based on the second code sequence;

determining a second delay time associated with the second filtered sample; and based on the second delay time, determining a relative location of the second object.

14. The method of claim 13, further comprising, before the time period, determining a sequence length, wherein the lengths of the first and second code sequences are each equal to the sequence length.

15. A method for environment mapping, comprising:

before a time period, determining a set of code sequences, each code sequence of the set associated with a respective periodic output signal that encodes the code sequence, wherein determining the set of code sequences comprises performing a stochastic optimization such that, for each pair of code sequences of the set, a respective cross-correlation between the respective periodic output sequences associated with the code sequences of the pair is less than a threshold value;

generating a first periodic optical output representative of a first periodic output signal, comprising modulating a first substantially continuous-wave carrier signal based on a first code sequence of the set of code sequences;

generating a second periodic optical output representative of a second periodic output signal, comprising modulating a second substantially continuous-wave carrier signal based on a second code sequence of the set of code sequences;

throughout the time period, continuously transmitting the first and second periodic optical outputs into an environment;

during the time period, at an optical sensor, receiving a return signal, the return signal comprising:
- a first reflection, from a first object within the environment, of the first periodic optical output; and
- a second reflection, from a second object within the environment, of the second periodic optical output;

determining a sample by selecting a contiguous time window of the return signal;

generating a first filtered sample, comprising filtering the sample based on the first code sequence;

determining a first delay time associated with the first filtered sample;

based on the first delay time, determining a relative location of the first object;

generating a second filtered sample, comprising filtering the sample based on the second code sequence;

determining a second delay time associated with the second filtered sample; and based on the second delay time, determining a relative location of the second object.

16. The method of claim 15, wherein:

the first periodic optical output is transmit into the environment by a first laser; and the second periodic optical output is transmit into the environment by a second laser.

17. The method of claim 15, wherein the optical sensor comprises a photodiode, wherein the return signal is received at the photodiode.

18. The method of claim 17, wherein the first and second reflections are received at the photodiode concurrently.

* * * * *

UNITED STATES PATENT AND TRADEMARK OFFICE
CERTIFICATE OF CORRECTION

| | | |
|---|---|---|
| PATENT NO. | : 11,467,288 B2 | |
| APPLICATION NO. | : 16/663142 | |
| DATED | : October 11, 2022 | |
| INVENTOR(S) | : Jacob Hillard et al. | |

It is certified that error appears in the above-identified patent and that said Letters Patent is hereby corrected as shown below:

In the Claims

Column 14, Line 45, In Claim 1, after "output", insert --,--

Signed and Sealed this
Seventh Day of March, 2023

Katherine Kelly Vidal
*Director of the United States Patent and Trademark Office*